United States Patent
Perlman (10) Patent No.: US 8,096,598 B2
(45) Date of Patent: Jan. 17, 2012

(54) AUTO-RELEASE VENTURI WITH VACUUM SWITCH

(75) Inventor: Maurice Perlman, Oak Park, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 907 days.

(21) Appl. No.: 12/107,957

(22) Filed: Apr. 23, 2008

(65) Prior Publication Data

US 2008/0265595 A1 Oct. 30, 2008

Related U.S. Application Data (60) Provisional application No. 60/926,184, filed on Apr. 25, 2007.

(51) Int. Cl.
*B25J 15/06* (2006.01)
(52) U.S. Cl. ...................................... 294/64.2
(58) Field of Classification Search ............. 294/64.2, 294/64.3, 64.1; 417/182, 187, 189; 414/752.1; 137/565.22, 565.23
See application file for complete search history.

(56) References Cited

U.S. PATENT DOCUMENTS

| | | | |
|---|---|---|---|
| 3,756,563 A | 9/1973 | Stone | |
| 4,662,668 A | 5/1987 | Hufford | |
| 5,188,411 A * | 2/1993 | Golden | 294/64.2 |
| 5,201,560 A * | 4/1993 | Golden | 294/64.2 |
| 5,277,468 A * | 1/1994 | Blatt et al. | 294/64.2 |
| 6,397,885 B1 | 6/2002 | Golden et al. | |
| 6,719,536 B2 * | 4/2004 | Schmalz et al. | 417/187 |
| 7,281,739 B2 | 10/2007 | Kniss | |
| 7,309,089 B2 | 12/2007 | Perlman et al. | |
| 7,540,309 B2 * | 6/2009 | Perlman et al. | 294/64.2 |
| 7,681,603 B2 * | 3/2010 | Perlman et al. | 294/64.2 |
| 2003/0230694 A1 | 12/2003 | Kalb | |
| 2007/0006940 A1 | 1/2007 | Perlman et al. | |

FOREIGN PATENT DOCUMENTS

| | | | |
|---|---|---|---|
| JP | 406031671 | * | 2/1994 |
| KR | 10-2002-0059375 | | 7/2002 |

* cited by examiner

*Primary Examiner* — Paul T Chin
(74) *Attorney, Agent, or Firm* — Harness, Dickey & Pierce, P.L.C.

(57) ABSTRACT

A material handling system has a vacuum cup assembly engagable with an object and movable to move the object using a pressurized air source, a vacuum cup, a venturi device and a vacuum valve and auto-release valve. The venturi device is in fluid communication with the vacuum cup and connected to the supply line so that pressurized air can be supplied to and through said venturi device to generate a partial vacuum when the perimeter seal of the vacuum cup is engaged with the object surface. The vacuum valve may open and close the supply line at a location upstream of the venturi device in response to a pressure level at the vacuum cup cavity. The auto-release valve may vent the vacuum cup cavity to atmosphere in response to reduced pressure in the supply line at a location upstream from the vacuum valve.

21 Claims, 3 Drawing Sheets

AUTO-RELEASE VENTURI WITH VACUUM SWITCH

CROSS REFERENCE TO RELATED APPLICATION

The present application claims the benefit of U.S. provisional application Ser. No. 60/926,184, filed Apr. 25, 2007 by Perlman for AUTO-RELEASE VENTURI WITH VACUUM SWITCH, which is hereby incorporated herein by reference in its entirety.

FIELD OF THE INVENTION

The present invention relates generally to material handling systems for moving objects and, more particularly, to material handling systems with vacuum cup assemblies for engaging the objects and substantially sealing thereto via operation of a pressurized air supply and a venturi device of the vacuum cup assemblies.

BACKGROUND OF THE INVENTION

It is known to provide a material handling system that includes vacuum cups or the like that are adapted to be moved into engagement with an object, such as a substantially flat object or panel or the like, and to lift and move the object to a desired location. Such vacuum cups or suction cups may be moved into engagement with the object, and a vacuum source may be actuated to create a partial vacuum between the object and the cup such that the object is retained to the cup as it is transported to the targeted area. An example of such a vacuum cup is disclosed in U.S. Pat. No. 4,662,668, issued May 5, 1987 to Hufford for MATERIAL HANDLING SENSOR DEVICE AND METHOD, which is hereby incorporated herein by reference in its entirety.

The vacuum at the cup may be provided by a venturi nozzle, whereby pressurized air is supplied or provided to a venturi nozzle at the cup and the air forced through the venturi nozzle creates a vacuum at the cup to seal the cup to the object surface. The venturi nozzle has an inlet port connected to the air supply and an exit port through which the air is blown. The internal cavity defined by the vacuum cup and object is in fluid communication with the venturi nozzle so that air is drawn out of the cavity as the air is blown through the venturi nozzle. When the air supply is deactivated, the vacuum within the cup cavity may slowly dissipate through the port that connects the vacuum cup cavity to the venturi nozzle and through the exit port of the venturi nozzle. Thus, there may be a delay between when the air supply is deactivated and when the vacuum dissipates a sufficient amount to readily release the vacuum cup from the object.

Typically, venturi vacuum generators use compressed air to generate vacuum via Bernoulli's principle and the Venturi effect, and thus, the air needs to be passing through the venturi nozzle the entire time that the vacuum is needed at the vacuum cup. In an effort to save compressed air and the associated cost of producing compressed air, it has been proposed to use a combination of an electronic vacuum sensor or electronic vacuum sensing switch and vacuum check valve to shut off the air supply and maintain vacuum. When the full vacuum is reached, the vacuum sensing switch senses the vacuum level and sends an electronic control signal to the valve to shut off the supply of air to the venturi nozzle while the check valve holds or substantially maintains the vacuum level in the vacuum cup. Because the vacuum may bleed off slowly (such as due to leakage at the vacuum cup seal), the electronic vacuum sensing switch will sense a lower vacuum level and turn the air supply back on to restore full vacuum, and then shut off the air supply when the vacuum level is again achieved. This configuration requires an electrical connection as well as a second air line to provide air to the vacuum cup to release the part from the vacuum cup.

SUMMARY OF THE INVENTION

The present invention provides a material handling system or a vacuum cup assembly for a material handling system that is operable to move one or more vacuum cups into engagement with an object and to pick up and move the object to a targeted or desired location. The material handling system may move the vacuum cup into engagement with the object, and may create a vacuum or partial vacuum at a cup cavity, such as via a pressurized air supply and a venturi device, to substantially seal the vacuum cup to the object. The vacuum cup assembly includes a valve or switch system that controls the air supply to the venturi device and that automatically vents the vacuum cup to atmosphere when the air supply source is deactivated. The valve or switch system comprises a pneumatic valve system or pressure sensitive system or pressure balance valve system and does not include or require electronic controls or the like to control the vacuum supply or generation and/or venting at the vacuum cup.

According to an aspect of the present invention, a vacuum cup assembly or system of a material handling system includes a vacuum cup, a venturi device and a pressure sensitive valve system. The vacuum cup assembly is engagable with an object and movable to move the object. The vacuum cup has a perimeter seal for engaging and substantially sealing at an object surface, and has a cavity defined by the perimeter seal and the object surface when the vacuum cup is engaged with the object surface. The venturi device is in fluid communication with the cavity of the vacuum cup. The venturi device is connected to a supply line through which pressurized air is supplied to and through the venturi device to generate a partial vacuum in the cavity when the perimeter seal of the vacuum cup is engaged with the object surface. The pressure sensitive valve system includes a vacuum valve or switch that is operable to open and close the supply line at a location upstream of the venturi device in response to a pressure level at the vacuum cup cavity. The pressure sensitive valve system also includes an auto-release valve or switch that is operable to vent the vacuum cup cavity to atmosphere in response to a pressure in the supply line as sampled at a location along the supply line that is upstream from the vacuum valve or switch. The vacuum switch and auto-release switch comprise pneumatic or non-electronic valves or switches that are responsive to a threshold pressure differential between the ports of the valves or switches (or a change in pressure at one of the ports or pilot lines of the valves or switches), such that electrical control devices are not required to control the air supply during transfer of the object and to control the venting of the vacuum cup at the drop-off or release destination.

The venturi device comprises a venturi nozzle positioned at and/or in fluid communication with the vacuum cup, such as within a vacuum body attached to the vacuum cup. The pressurized air supply is activatable to blow or force pressurized air through the venturi nozzle to generate the at least partial vacuum in a vacuum passageway (such as a passageway or conduit that connects a vacuum port of the venturi device or nozzle to the vacuum cup) and the vacuum cup cavity by drawing air from the vacuum passageway and the cavity and into the venturi nozzle via the vacuum port of the venturi nozzle.

The vacuum switch or valve is responsive to the vacuum level being at a desired or targeted or appropriate level, and will open to allow the pressurized air to flow to the venturi device when the vacuum level is reduced (such as via leakage at the vacuum cup or the like) and will close to limit pressurized air flow to the venturi device when the vacuum cup is at the desired or appropriate vacuum level. The venting switch or valve is responsive to the pressure at the supply line (and upstream of the vacuum switch) and will remain closed when the pressurized air supply or source is activated, and will automatically open to vent the vacuum cup to atmosphere in response to the pressurized air supply or source being deactivated (as indicated by a drop in pressure in the supply line).

Therefore, the present invention provides a vacuum cup system or assembly for a material handling system that moves the vacuum cup assembly into engagement with an object. A vacuum or partial vacuum may be readily applied to the vacuum cup of the vacuum cup assembly to substantially seal the vacuum cup to the object. When the vacuum level at the vacuum cup reaches a threshold pressure, the pressurized air flow to the venturi device may be cut off via a vacuum switch (while the pressurized air supply or source or device may still be operating to generate pressurized air flow, such as for other vacuum cups of the material handling system that are also being used to move the object or another object), while a one-way check valve limits leakage of air to the vacuum cup such that the vacuum level at the vacuum cup is substantially maintained. When the vacuum cup assembly and object are moved to the targeted destination of the object, the pressurized air supply may be deactivated, and the vacuum or partial vacuum within the vacuum cup is then automatically and rapidly vented to atmosphere via the venting switch or valve to release the vacuum cup from the object at the desired or targeted destination or location. The vacuum switch or valve and the venting switch or valve are operable in response to a change in pressure at the supply line and vacuum cup line, respectively, such that the material handling system of the present invention does not require electronic control of the valves to pick up, move and release the object via the vacuum cup assemblies.

These and other objects, advantages, purposes and features of the present invention will become apparent upon review of the following specification in conjunction with the drawings.

DESCRIPTION OF THE PREFERRED EMBODIMENTS

Figure 1:
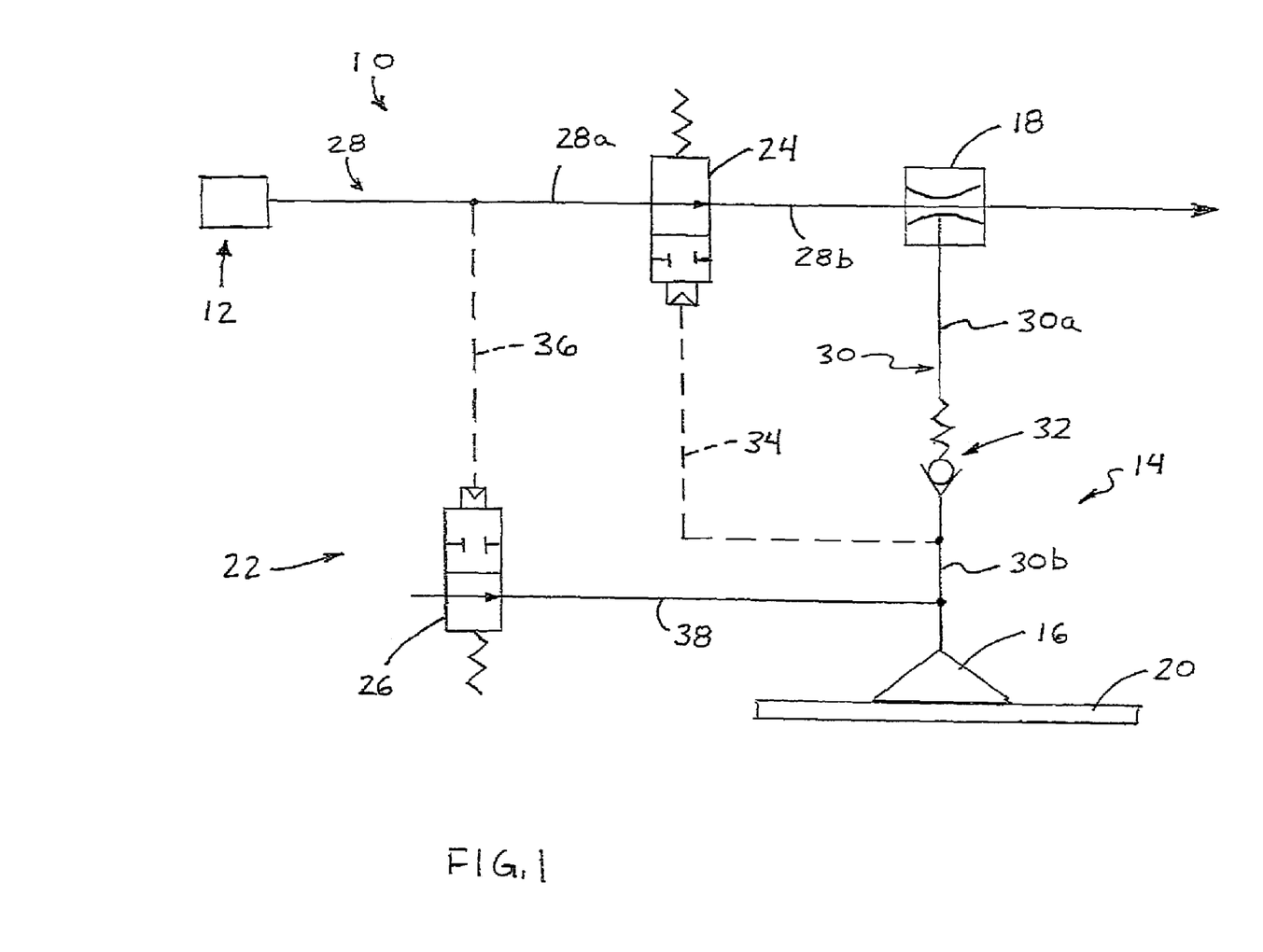
FIG. 1 is a schematic of the vacuum cup assembly and vacuum system in accordance with the present invention.

Referring now to the drawings and the illustrative embodiments depicted therein, a material handling system 10 includes a pressurized air supply or source 12 and a vacuum cup assembly 14, which includes a vacuum cup 16 and a venturi device 18 that is configured to create a vacuum or partial vacuum within the vacuum cup 16 when the vacuum cup is engaged with a surface of an object 20 and when the pressurized air supply is activated to force or blow pressurized air through the venturi device (FIG. 1). The vacuum cup assembly 14 is mountable to a support assembly (not shown) of a material handling system, which is operable to move the support and vacuum cup assembly (or multiple vacuum cup assemblies or suction cups) into engagement with an object, where the vacuum cup may engage and seal to the object, and is operable to pick up and move the object to a targeted destination, whereby the object may be released from the vacuum cup or cups. The material handling system includes a pneumatic or non-electrical switch or valve system 22 comprising a vacuum valve or switch 24 for controlling the air supply to the venturi device 18, and an automatic release valve or switch 26 for automatically venting the vacuum within the vacuum cup 16 to atmosphere when the pressurized air supply 12 is deactivated, as discussed below.

As shown in FIG. 1, pressurized air supply or source 12 provides pressurized air through a supply line or conduit 28 to venturi device 18 via vacuum switch 24 (which is disposed between an upstream supply line 28a and a downstream supply line 28b). The pressurized air flows through a venturi nozzle of venturi device 18 and exhausts via an outlet port of the venturi device (such as by utilizing aspects of the venturi devices described in U.S. patent application Ser. No. 11/430,712, filed May 9, 2006 by Perlman et al. for AUTO-RELEASE VACUUM CUP, which is hereby incorporated herein by reference in its entirety). A vacuum port of the venturi device is in fluid communication with vacuum cup 16 via a vacuum cup line 30, which includes a vacuum check valve 32 (which is disposed between an upstream vacuum cup line 30a and a downstream vacuum cup line 30b) to allow air flow along vacuum cup line 30 toward the venturi device 18 (so that the air can be drawn out from the vacuum cup by the vacuum port of the venturi device), but limits air flow in the opposite direction such that the vacuum or partial vacuum at the vacuum cup is maintained or substantially maintained even when the air flow through the venturi device is stopped.

Vacuum switch 24 is disposed along supply line 28 and is in fluid communication with downstream vacuum cup line 30b via a vacuum pilot line or port 34, such that vacuum switch 24 is responsive to the pressure or partial vacuum in vacuum pilot line 34, as discussed below. As can be seen in FIG. 1, vacuum switch 24 is in fluid communication with (or disposed in-line with) supply line 28 at a location that is upstream from the venturi device, and is in fluid communication with downstream vacuum cup line 30b (via vacuum pilot line or port 34) at a location that is between the check valve 32 and the vacuum cup 16, such that the vacuum switch is responsive to the pressure or vacuum level at the vacuum cup cavity.

Auto-release switch 26 is disposed at or in fluid communication with downstream vacuum cup line 30b and is in fluid communication with upstream supply line 28a, such that auto-release switch 26 is responsive to the pressure in supply line 28 and is operable to vent the partial vacuum at vacuum cup line 30 and vacuum cup 16 when the pressurized air supply is deactivated, as discussed below. Auto-release switch 26 is connected to upstream supply line 28a via a supply air pilot line or port 36 that connects to the supply line 28 at a location that is upstream from vacuum switch 24, and is connected to vacuum cup line 30 via a venting line or conduit 38 that connects to the vacuum cup line 30 at a location that is between vacuum pilot line 34 and the vacuum cup 16.

Although shown as separate lines or conduits, it is envisioned that the valve system and venturi device and check valve may be incorporated into or integral with a vacuum body or device, such that the valves and venturi device may be part of a self-contained pressure/flow control system attached to the vacuum cup, while remaining within the spirit and scope of the present invention. Optionally, for example, the vacuum pilot line 34 and the venting line 38 may be connected to the vacuum cup or may be connected to or in fluid communication with a passageway of a vacuum device or body that extends between the venturi nozzle and the vacuum cup.

Pressurized air supply or source 12 may comprise any suitable pressurized air source, such as an air compressor or the like, that provides pressurized air flow to and through the supply line or hose or conduit 28 to the vacuum cup assembly or assemblies. The vacuum cup assembly 14 may comprise a body portion that houses the venturi device 18 and valve system 22, whereby the pressurized air flows through the vacuum switch 24 (when the vacuum switch is opened, as discussed below) and through the venturi device 18 and out the exhaust port of the venturi device 18. The vacuum cup assembly 14 may be connected to a support arm (not shown) or the like of the material handling device, and may be connected to any type of support arm, without affecting the scope of the present invention. The vacuum cup assembly and material handling system of the present invention may utilize aspects described in U.S. Pat. No. 7,309,089, issued Dec. 18, 2007 to Attee et al. for VACUUM CUP; U.S. Pat. No. 7,281,739, issued Oct. 16, 2007 to Kniss for ADJUSTABLE MOUNT FOR VACUUM CUP; and/or U.S. patent application Ser. No. 11/430,712, filed May 9, 2006 by Perlman et al. for AUTO-RELEASE VACUUM CUP, which are hereby incorporated herein by reference in their entireties.

As is known in the art, venturi device 18 includes or defines a vacuum generating passageway or nozzle that has an outlet or exit port and an inlet or entry port at opposite ends of the passageway or nozzle. A vacuum passageway or port of the venturi device 18 connects to and is in fluid communication with vacuum cup line 30 and vacuum cup 16 such that air is drawn from vacuum cup 16 as pressurized air is forced through the passageway of the venturi device 18. As is known in the vacuum cup and venturi nozzle art, the passageway of the venturi nozzle comprises a narrowing and widening passageway to increase the air flow rate through the venturi nozzle when the air supply or source is activated (and when the vacuum switch is open to allow the pressurized air to flow therethrough, as discussed below), whereby air flow through the venturi nozzle draws air through the vacuum port and vacuum cup line 30 to create a vacuum or partial vacuum at the vacuum cup 16 and object. Optionally, a silencing element or diffusing element (not shown) may be positioned at an outlet end of the venturi nozzle or device, such as described in U.S. patent application Ser. No. 11/430,712, filed May 9, 2006 by Perlman et al. for AUTO-RELEASE VACUUM CUP, which is hereby incorporated herein by reference in its entirety.

Vacuum cup 16 of vacuum cup assembly 14 is thus attached to the vacuum cup line or port 30, which in turn is connected to the vacuum port of the venturi device 18. Vacuum cup 16 includes a body portion and a perimeter seal portion, wherein the body portion includes an opening therethrough for fluid communication between the vacuum cup cavity and the vacuum cup line and venturi device. When the pressurized air supply is activated, the venturi nozzle or device draws air from the cavity of the vacuum cup that is defined by the body portion and perimeter seal of the vacuum cup and the surface of the object 20 that is engaged with an engaging end of the perimeter seal of the vacuum cup 16 (with the air being drawn through the check valve 32 in the direction of air flow substantially freely allowed by the check valve). Vacuum cup 16 may be integrally or unitarily molded from an elastomeric material or may be otherwise formed or molded, without affecting the scope of the present invention. Vacuum cup 16 may comprise any type of vacuum or suction cup, such as a vacuum cup having a bellows style or accordion style perimeter seal, or a tapered perimeter seal portion or the like, and/or such as a seal portion of the types described in U.S. Pat. No. 7,309,089, issued Dec. 18, 2007 to Attee et al. for VACUUM CUP, which is hereby incorporated herein by reference in its entirety, and/or other type of vacuum cup, without affecting the scope of the present invention. Optionally, the vacuum cup assembly may include an object sensor or the like, such as a sensor of the types described in U.S. Pat. No. 4,662,668, issued May 5, 1987 to Hufford for MATERIAL HANDLING SENSOR DEVICE AND METHOD, and/or U.S. Pat. No. 7,281,739, issued Oct. 16, 2007 to Kniss for ADJUSTABLE MOUNT FOR VACUUM CUP, which are hereby incorporated herein by reference in their entireties.

Vacuum switch 24 comprises a pressure switch or pressure sensitive switch that is openable to allow the pressurized air to flow therethrough (and thus along the air supply line 28, such as between upstream air supply line 28a and downstream air supply line 28b) and from the pressurized air supply 12 to the venturi device 18. The vacuum switch opens to allow air flow therethrough when the pressure in vacuum pilot line 34 is at or above a threshold pressure (such as a vacuum level that is less than a desired or appropriate vacuum level at the vacuum cup for lifting and moving the object with the vacuum cup or cups) or at or above a relative pressure differential as compared to the pressure of the air in the supply line. When the pressure or vacuum level at the vacuum cup is at the full or substantial vacuum level, the vacuum switch automatically closes (due to the lower pressure in the vacuum pilot line) to limit or substantially preclude pressurized air flow to and through the venturi device.

When the pressurized air flow to the venturi device is stopped, the check valve 32 limits air flow along vacuum cup line 30 to the vacuum cup 16 so that the vacuum level at the vacuum cup and object is substantially maintained at the desired or appropriate level. As air may leak into the vacuum cup cavity (such as via air leakage between the perimeter seal and the object and/or air leakage through the venturi device and/or check valve or the like), the vacuum level at the vacuum cup cavity drops (i.e., the absolute air pressure within the vacuum cup cavity may rise), whereby the vacuum switch 24 automatically opens when the pressure in the vacuum cup line 30 (and pilot line 34) reaches the threshold level (such as when the vacuum level at pilot line 34 is no longer sufficient to maintain the vacuum valve or switch in the closed position) so that the air flow to and through the venturi device resumes to re-attain the desired or appropriate vacuum level at the vacuum cup cavity.

Figure 2:
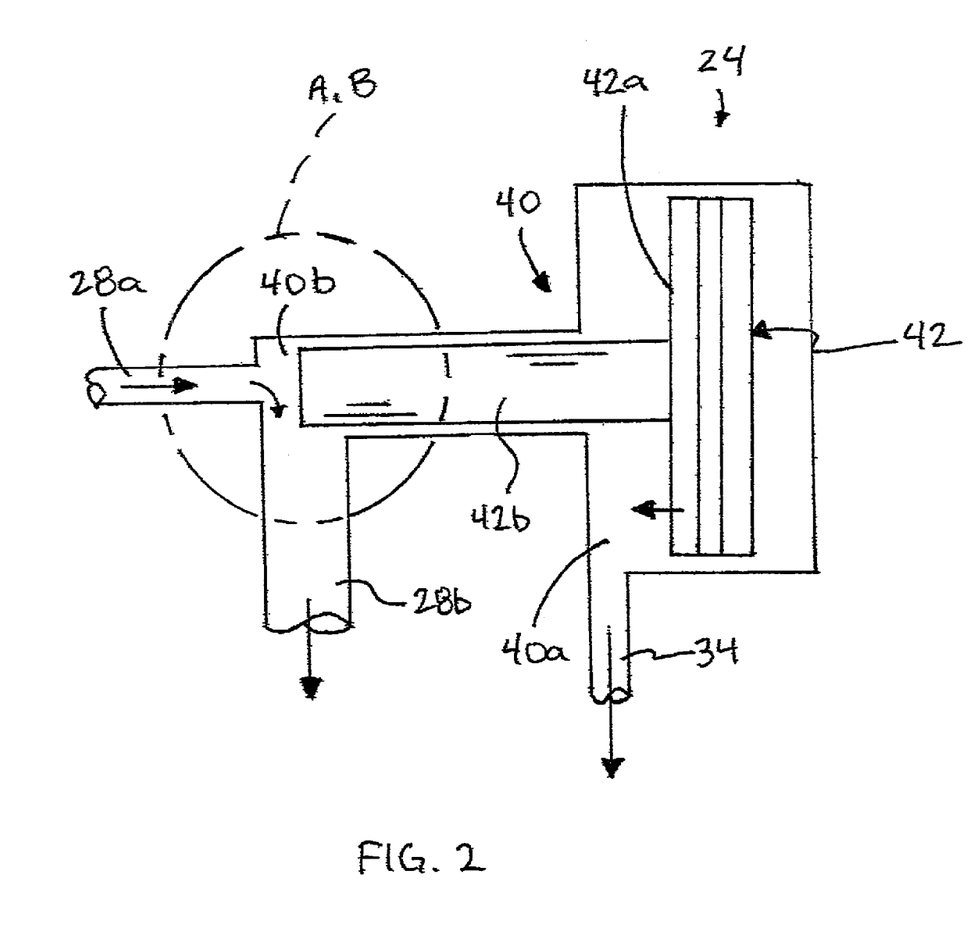
FIG. 2 is a schematic of a vacuum valve or switch in accordance with the present invention.
Figure 2A:
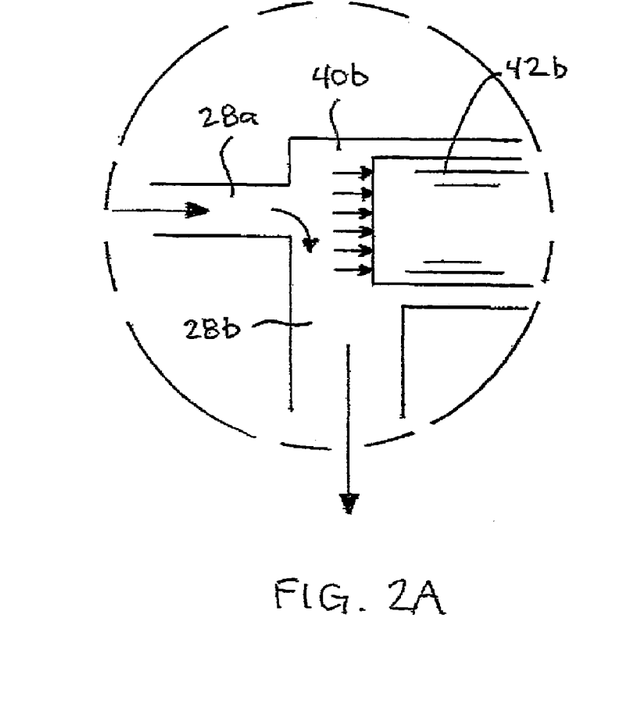
FIG. 2A is an enlarged view of the inlet area A, B of the vacuum valve or switch of FIG. 2, with the valve opened for providing pressurized air to the venturi device.
Figure 2B:
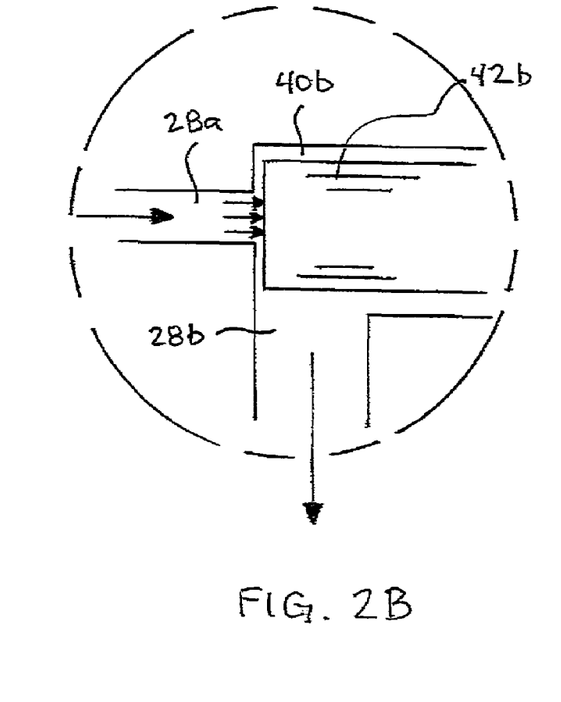
FIG. 2B is an enlarged view of the inlet area A, B of the vacuum valve or switch of FIG. 2, with the valve closed to limit the supply of pressurized air to the venturi device.

In the illustrated embodiment, and with reference to FIGS. 2, 2A and 2B, vacuum switch or valve 24 includes a valve chamber 40 and a valve 42 that is movable within the valve chamber 40 to open and close the valve or switch in response to the pressures in the supply line 28a and the pilot line 34. The valve chamber 40 comprises a larger diameter (or larger area) portion 40a in fluid communication with the pilot line 34 and a smaller diameter (or smaller area) portion 40b in fluid communication with the air supply line 28a, while the valve 42 comprises a larger diameter (or larger surface area) valve portion 42a that is movable within larger portion 40a of valve chamber 40, and a smaller diameter (or smaller surface area) valve portion 42b that is movable within smaller portion 40b of valve chamber 40. Also, the air supply line 28a has an inlet to the valve or switch (such as at the end of the smaller valve portion 42b) that has a diameter or cross sectional area that is smaller than the diameter or surface area of the smaller valve portion 42b.

As vacuum switch 24 receives the pressurized air or gas from upstream supply line 28a, the air pressure acts against the smaller surface area of the smaller portion 42b of valve 42 to urge the valve 42 toward the opened position (such as to the right in FIG. 2) and to retain the valve in the opened position (shown in FIGS. 2 and 2A). When the smaller valve portion 42b is moved from its sealed position (FIG. 2B), the pressurized air supply acts against substantially the entire surface area of the smaller valve portion 42b as compared to acting against only a reduced portion (as defined by the size of the air supply inlet at the valve chamber) of the smaller valve portion 42b when the valve is in its closed or sealed position. This can be seen by comparison of the arrows (which represent the force applied by the air pressure) at the end of the smaller valve portion 42b in FIG. 2A as compared to FIG. 2B.

As the supply air passes through the vacuum switch and through the venturi device to generate the partial vacuum in the vacuum cup cavity, a vacuum pressure is generated in pilot line 34 as well, which draws air from the larger chamber 40a of vacuum switch 24 and acts against the larger surface area of larger valve portion 42a to urge the valve toward its closed position. When the vacuum level in the vacuum cup 16 and pilot line 34 is great enough such that the force applied to the larger valve portion 42a (the vacuum pressure times the surface area of the larger valve portion) is greater than the force applied to the smaller valve portion 42b (the supply air pressure times the surface area of the smaller valve portion), the valve 42 is moved toward the closed position (such as to the left in FIG. 2), and closes or seals at the supply air inlet 28a to close the vacuum valve or switch 24.

When the valve is closed (as shown in FIG. 2B), the smaller valve portion 42b is substantially seated or sealed at the supply air inlet line 28a or port to limit or substantially preclude air flow from upstream supply line or inlet line 28a, through vacuum switch 24, to downstream supply line 28b and to venturi device 18. When the valve is in such a closed position, the pressurized supply air in inlet line 28a is then acting against the reduced surface area portion of the smaller valve portion 42b and not against the entire surface area of the smaller valve portion 42b, thereby exerting a smaller or reduced opening force at the valve when the valve is in its closed position. Because of the reduced surface area of the valve at which the pressurized supply air acts against when the valve is closed versus when the valve is at least partially opened, the vacuum switch 24, once closed, will remain in the closed position until the vacuum level in the larger chamber 40 drops or reduces (such as via leakage or bleed down of the vacuum at or in the vacuum cup) a sufficient or substantial amount such that the reduced force at the reduced surface area of the smaller valve portion is sufficient to overcome the force applied to the larger valve portion by the reduced vacuum in the larger chamber.

Accordingly, the vacuum valve or switch 24 is automatically and non-electronically responsive to the relative pressures in the supply line and the vacuum cup. The vacuum valve or switch 24 thus may be closed when the vacuum level in the larger chamber 40a (acting on the larger surface area of the larger valve portion 42a) exerts a closing force that balances and counteracts or exceeds the force on the smaller valve surface or portion 42b. When the valve is closed, the closing force generated by the vacuum in the larger chamber balances or counteracts the reduced force at the reduced portion of the smaller valve surface, and thus the valve may remain closed longer or until the vacuum level drops (in other words, when the absolute pressure increases) a sufficient or substantial amount. Once the vacuum level drops the sufficient amount, the supply air pressure is able to move or urge the valve toward the open position. When the valve is at least partially opened, the supply air then acts against substantially the entire surface area of the smaller valve portion, whereby the geometry of the valve portions requires that a greater vacuum be generated in the larger chamber to balance and counteract the pressures and close the valve. For example, the vacuum valve or switch may be closed when the vacuum level in the larger chamber is at or above a first threshold level, such as, for example, about 22 in Hg of vacuum, and may stay closed until the vacuum level drops to a second or lower threshold level, such as, for example, about 18 in Hg of vacuum. Such a vacuum balance and valve configuration limits or substantially precludes continuous or substantially continuous cycling or opening/closing of the vacuum switch with slight fluctuations of pressure, and thus provides enhanced operation of the vacuum switch and the material handling system of the present invention.

Similarly, auto-release or venting switch 26 comprises a non-electronic pressure switch that is openable to vent the vacuum cup line 30 and vacuum cup 16 to atmosphere. When the pressurized air supply or source is activated, the supply air pilot line 36 uses some of the pressurized air from the upstream supply line 28a to close the auto-release switch or valve. The auto-release switch opens to vent the vacuum cup line 30 and vacuum cup cavity to atmosphere by allowing air generally at atmospheric pressure to flow through the auto-release switch 26 and to the vacuum cup line 30 and vacuum cup cavity (via the venting line 38) when the pressure in the upstream supply line 28a falls below a threshold level (such as when the pressurized air as supplied via supply air pilot line 36 is not sufficient to maintain the venting valve or valves in the closed position), such as occurs when the pressurized air supply 12 is deactivated. Thus, the auto-release switch 26 automatically closes the vents or venting ports when the air supply or source is activated, and automatically opens the vents to vent the vacuum cup cavity to atmosphere when the pressurized air supply or source 12 is deactivated, in order to enhance the release of the vacuum cup from the object at the targeted destination.

During operation of vacuum cup assembly 10, pressurized air supply or source 12 is activated and pressurized air flows through upstream supply line 28a and through vacuum switch 24 and through downstream supply line 28b to venturi device 18 and out the exit port of venturi device 18. As the air flows through the nozzle of venturi device 18, air is drawn from the vacuum cup cavity (at the vacuum cup 16 and object 20) and through the vacuum cup line 30 and into the venturi nozzle and out the exit port of venturi device 18. As the air is drawn from the vacuum cup 16 and to the venturi device 18, the check valve 32 opens or otherwise allows the air to flow in this direction. When the vacuum level or partial vacuum level at the vacuum cup 16 and vacuum cup line 30b reaches a threshold or sufficient level, the vacuum switch 24 closes to limit or substantially preclude air flow through the vacuum switch and along supply line 28 and through venturi device 18. When the air flow is no longer flowing through venturi device 18, the venturi device no longer draws air from the vacuum cup to generate the partial vacuum in the vacuum cup. However, the check valve 32 closes to limit air flow from the venturi device to the vacuum cup 16 so that leakage of or venting of the air at the vacuum cup is limited and the partial vacuum level at the vacuum cup is substantially maintained so that the vacuum cup remains substantially sealed against the object surface.

The material handling system thus may lift and move the object via the vacuum cup or cups even for those cups that have the air flow to the respective venturi devices limited (such as via respective vacuum switches). The pressurized air supply or source remains activated during the lifting and transferring or moving process, and thus may provide pressurized air to one or more other vacuum cup assemblies of the material handling system during the lifting and transferring/moving process. If the vacuum level within a vacuum cup is reduced to a threshold level (such as due to venting or leaking of air into the vacuum cup, such as at the perimeter seal of the vacuum cup or via the check valve), the respective vacuum switch re-opens (such as in the manner described above) to allow pressurized air flow to and through the venturi device to again generate the desired vacuum level at that vacuum cup. The opening and closing of the vacuum switch may be repeated multiple times during the lifting and transferring process depending on the degree of leakage of air into the vacuum cup cavity and vacuum cup line. The object thus may be lifted and moved to the desired or targeted location via the material handling system.

When the object is moved to the desired or targeted location, the air supply 12 may be deactivated to release the vacuum cup or cups from the object surface. When the pressurized air supply or source is deactivated, auto-release valve 26 detects the drop in pressure at the supply line 28 (via air pilot line 36), and automatically opens to vent the vacuum cup line 30 (and thus the vacuum cup 16) via vent line 38 once the pressure in air pilot line 36 is no longer sufficient to maintain the vents or vent valves or auto-release valves or switches in the closed positions. The vacuum within the cavity of vacuum cup 16 is thus quickly and automatically vented to atmosphere via air flow through the venting line 38 and auto-release valve 26. The vacuum or partial vacuum within vacuum cup 16 thus is quickly released or vented after the pressurized air supply is deactivated, and does not have the delay in venting that typically occurs as the vacuum or partial vacuum slowly dissipates through the ports of the venturi nozzle of known vacuum cups. The vacuum cup assembly of the present invention thus may be readily removed from the object when the pressurized air supply is deactivated.

Optionally, the vent line may be connected to a pressure chamber (not shown) connected to the air supply line via the auto-release valve. When the pressurized air supply or source is deactivated, the auto-release valve detects the drop in pressure at the supply line (via the air pilot line), and automatically opens to create fluid communication between the vacuum cup line and the pressure chamber (containing pressurized air that remains pressurized even after the air supply is shut off or discontinued) via the vent line once the pressure in the air pilot line is no longer sufficient to maintain the vents in the closed positions. The pressurized air within the pressure chamber is thus directed to the vacuum cup to forcibly discharge the object from the vacuum cup.

The present invention thus combines a single air line auto-release feature with a vacuum holding feature to achieve a very efficient venturi vacuum generator. The supply air pressure is turned on (such as via a main control valve), whereby the pressurized air passes through the venturi nozzle to generate the vacuum at the vacuum cup. The auto-release valve uses a small portion of this supply air to close the vent ports from the vacuum connection to the vacuum cup. Vacuum is then generated in the vacuum cup when the perimeter seal of the vacuum cup contacts the panel or object. The vacuum switch senses this vacuum and shuts off the air to the venturi device downstream of the location where the auto-release valve is connected to the supply line. This keeps the auto-release valve closed, maintaining the vacuum in the vacuum cup. A check valve is also used to maintain vacuum in the cup while the air flow to the venturi is limited or shut off. When the vacuum bleeds off below the vacuum switch's minimum level, the vacuum switch automatically opens the vacuum switch or valve at the supply line to again supply air to the venturi device to restore full vacuum level at the vacuum cup, with the vacuum switch again shutting off the air supply to the venturi when the vacuum level is attained. When the panel or object is moved to the desired or targeted location and needs to be released, the main control valve is actuated to deactivate the pressurized air source to shut off the air supply to the venturi device, whereby the auto-release valve automatically opens the vent ports, and thus substantially instantly releases the panel or object from the vacuum cup. Because the pilot line of the auto-release switch is connected to the supply line at a location that is upstream of the vacuum switch (in other words, at a location that is between the pressurized air supply or source and the vacuum switch), the auto-release switch detects the pressure drop when the air supply or source is deactivated and not when the vacuum switch closes the supply line.

The vacuum cup assembly of the present invention thus provides a vacuum or partial vacuum at a vacuum cup to substantially seal the vacuum cup to an object, and automatically vents the vacuum cup to atmosphere to release the object from the vacuum cup, without electronic sensors or solenoids or valves or controls, since the vacuum switch and auto-release switch are both pressure sensitive or pressure responsive switches that respond to a change in pressure in the respective lines or conduits or ports. The venting switch or auto-release switch detects the pressure in the supply line upstream from the vacuum switch so that the vacuum switch may cut off the pressurized air flow to the venturi device when an appropriate vacuum level is achieved at the vacuum cup, without resulting in the venting switch venting the vacuum cup to atmosphere in response to the pressure drop in the supply line downstream from the vacuum switch. The vacuum cup is thus readily and automatically disengaged from the object when the pneumatic device or pressurized air supply or source is deactivated to substantially vent the vacuum cup cavity to atmosphere to release the object from the vacuum cup at the desired or targeted destination or location.

Changes and modifications to the specifically described embodiments may be carried out without departing from the principles of the present invention, which is intended to be limited only by the scope of the appended claims as interpreted according to the principles of patent law.

The embodiments of the invention in which an exclusive property is claimed are defined as follows:

1. A material handling system having a vacuum cup assembly that is engagable with an object and movable to move the object, said material handling system comprising:

a pressurized air source operable to generate pressurized air flow through a supply line;

a vacuum cup having a perimeter seal for engaging and substantially sealing at an object surface, said vacuum cup having a cavity defined by said perimeter seal and the object surface when said vacuum cup is engaged with the object surface;

a venturi device in fluid communication with said cavity of said vacuum cup, said venturi device being connected to said supply line so that pressurized air can be supplied to and through said venturi device to generate a partial vacuum in said cavity when said perimeter seal of said vacuum cup is engaged with the object surface;
a vacuum valve operable to open and close said supply line at a location that is upstream of said venturi device in response to a pressure level at said vacuum cup cavity; and
an auto-release valve operable to vent said vacuum cup cavity to atmosphere in response to a pressure in said supply line at a location that is upstream from said vacuum valve.

2. The material handling system of claim 1, wherein said vacuum valve comprises a pressure sensitive switch that opens said supply line when a vacuum level is detected that is above a threshold pressure.

3. The material handling system of claim 1, wherein said vacuum cup is connected to a vacuum port of said venturi device via a vacuum cup line, said vacuum cup line having a check valve therealong to limit air flow from said venturi device toward said vacuum cup.

4. The material handling system of claim 3, wherein said vacuum valve is in fluid communication with said vacuum cup line via a pilot line connected between said vacuum valve and said vacuum cup line at a location between said check valve and said vacuum cup.

5. The material handling system of claim 4, wherein said auto-release valve is in fluid communication with said supply line via a pilot line connected between said supply line and said auto-release valve, said pilot line connecting to said supply line at a location upstream of said vacuum valve.

6. The material handling system of claim 1, wherein said auto-release valve is operable to vent said vacuum cup cavity to atmosphere in response to a pressure in said supply line that is indicative of said pressurized air source being deactivated.

7. The material handling system of claim 1, wherein said auto-release valve is in fluid communication with said supply line via a pilot line connected between said supply line and said auto-release valve, said pilot line connecting to said supply line at a location upstream of said vacuum valve.

8. The material handling system of claim 1, wherein said vacuum valve is in fluid communication with said vacuum cup via a pilot line connected between said vacuum valve and a vacuum cup line connecting said venturi device to said vacuum cup.

9. The material handling system of claim 1, wherein said vacuum valve comprises a pneumatically controlled valve.

10. The material handling system of claim 1, wherein said vacuum valve is operable to open and close in response to an imbalance in forces applied to said valve by (a) the pressure in said supply line and (b) the partial vacuum at said vacuum cup.

11. The material handling system of claim 10, wherein said vacuum valve is operable to open when the imbalance in forces is at least in part due to said partial vacuum at said vacuum cup dropping to a lower vacuum level, and is operable to close when the imbalance in forces is at least in part due to said partial vacuum at said vacuum cup rising to a higher vacuum level.

12. The material handling system claim 11, wherein said vacuum valve comprises a valve body with a movable valve member disposed therein and wherein said movable valve member comprises a larger diameter valve portion that responds to said partial vacuum at said vacuum cup and a smaller diameter portion that responds to said pressure in said supply line, wherein said movable valve member is urged towards an opened position when said pressure in said supply line exerts a force at said smaller diameter portion that is greater than a force exerted by said partial vacuum at said larger diameter portion.

13. The material handling system of claim 12, wherein an inlet port of said valve body at said smaller diameter portion of said movable valve member has a cross sectional area that is less than a cross sectional area of said smaller diameter portion, and wherein a first force applied by the said supply line pressure at said smaller diameter portion when said valve is closed and said smaller diameter portion is seated at said inlet port is less than a second force applied by said supply line pressure at said smaller diameter portion when said valve is open, whereby said valve is urged to an open position when said first force is greater than said force exerted by said partial vacuum and said valve is urged toward its closed position when said force exerted by said partial vacuum is greater than said second force.

14. A method of moving objects in a material handling system, said method comprising:
providing a pressurized air source operable to generate pressurized air flow through a supply line;
providing a vacuum cup having a perimeter seal for engaging and substantially sealing at an object surface, said vacuum cup having a cavity defined by said perimeter seal and the object surface when said vacuum cup is engaged with the object surface;
providing a venturi device connected to said supply line and in fluid communication with said cavity of said vacuum cup, said venturi device being connected to said supply line so that pressurized air can be supplied to and through said venturi device;
generating pressurized air flow through said supply line;
generating a partial vacuum in said cavity when said perimeter seal of said vacuum cup is engaged with the object surface using said venturi device;
providing a vacuum valve that is operable to open and close said supply line at a location that is upstream of said venturi device in response to a pressure level at said vacuum cup cavity;
providing an auto-release valve in fluid communication with said supply line at a location upstream of said vacuum valve;
at least partially sealing said vacuum cup at the object surface using said partial vacuum and moving the object and vacuum cup; and
venting said vacuum cup cavity to atmosphere to release the object from said vacuum cup, and wherein venting said vacuum cup cavity comprises venting said vacuum cup cavity to atmosphere via said auto-release valve in response to a threshold pressure in said supply line at a location that is upstream from said vacuum valve.

15. The method of moving objects of claim 14, further comprising connecting said vacuum cup to a vacuum port of said venturi device via a vacuum cup line, said vacuum cup line having a check valve therealong to limit air flow from said venturi device toward said vacuum cup.

16. The method of moving objects of claim 15, wherein said vacuum valve is in fluid communication with said vacuum cup line via a pilot line connected between said vacuum valve and said vacuum cup line at a location between said check valve and said vacuum cup.

17. The method of moving objects of claim 14, wherein said auto-release valve is in fluid communication with said supply line via a pilot line connected between said supply line and said auto-release valve.

18. The method of moving objects of claim 17, wherein venting said vacuum cup cavity to atmosphere comprises venting said vacuum cup cavity to atmosphere via said auto-release valve in response to a threshold pressure in said supply line that is indicative of said pressurized air source being deactivated.

19. The method of moving objects of in claim 14, wherein said vacuum valve opens and closes in response to an imbalance in forces applied to a valve by (a) the pressure in said supply line and (b) the partial vacuum at said vacuum cup, and wherein said vacuum valve opens when the imbalance is due to said partial vacuum at said vacuum cup dropping to a lower threshold level, and closes when the imbalance is due to said partial vacuum at said vacuum cup rising to a higher threshold level.

20. The method of moving objects of claim 19, wherein said vacuum valve comprises a valve body with a movable valve member disposed therein and wherein said movable valve member comprises a larger diameter valve portion that responds to said partial vacuum at said vacuum cup and a smaller diameter portion that responds to said pressure in said supply line, wherein said movable valve member is urged towards an opened position when said pressure in said supply line exerts a force at said smaller diameter portion that is greater than a force exerted by said partial vacuum at said larger diameter portion.

21. The method of moving objects of claim 20, wherein an inlet port of said valve body at said smaller diameter portion of said movable valve member has a cross sectional area that is less than a cross sectional area of said smaller diameter portion, and wherein a first force applied by the said supply line pressure at said smaller diameter portion when said valve is closed and said smaller diameter portion is seated at said inlet port is less than a second force applied by said supply line pressure at said smaller diameter portion when said valve is open, whereby said valve is urged to an open position when said first force is greater than said force exerted by said partial vacuum and said valve is urged toward its closed position when said force exerted by said partial vacuum is greater than said second force.

* * * * *